Dec. 6, 1938.    J. G. BEJARANO    2,139,351
TEMPERATURE CONTROL PROCESS AND APPARATUS
Filed Sept. 18, 1937
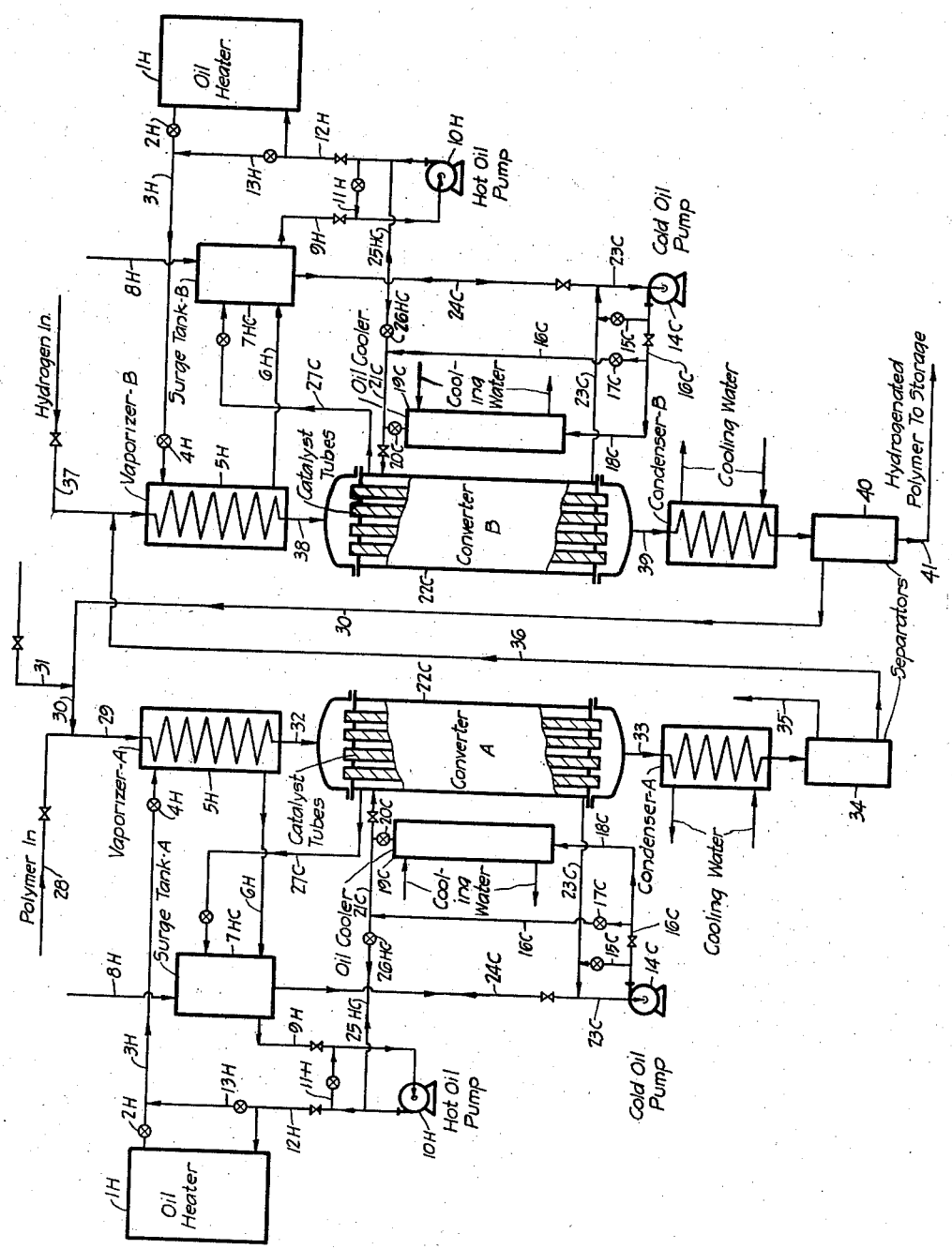
Inventor: Julio G. Bejarano
By his Attorney Arthur B Bakalar Patented Dec. 6, 1938

2,139,351

UNITED STATES PATENT OFFICE 2,139,351

TEMPERATURE CONTROL PROCESS AND APPARATUS

Julio G. Bejarano, Pittsburg, Calif., assignor to Shell Development Company, San Francisco, Calif., a corporation of Delaware Application September 18, 1937, Serial No. 164,549

8 Claims. (Cl. 260—690)

This invention relates to a method of and an apparatus for accurately and efficiently controlling the treatment and/or reaction temperatures in multi-stage chemical treatment and/or reaction systems wherein the raw material or materials to be treated are passed successively through a plurality of treatment and/or reaction stages at least one of which stages involves the consumption of heat while another involves the production of heat.

More particularly, the invention provides an economical, highly efficient process of great flexibility in accordance with which the same or different temperatures can be maintained substantially constant in the separate stages of multistage reaction systems comprising at least one stage, wherein the material or materials to be treated in the system is/are subjected to a treatment or reaction requiring the continuous addition of heat, coupled with another stage of the same system wherein the material or materials leaving or to be subsequently treated in the aforementioned endothermic stage are subjected to a treatment or reaction requiring the continuous removal of heat. In its simplest embodiment, although it is by no means limited to application in such simple systems, the invention provides means for controlling the temperatures in a system in which a material is subjected to an endothermic reaction (vaporization, cracking, dehydrogenation, dehydration, etc.) in one stage and subjected to an exothermic reaction (condensation, oxidation, polymerization, hydrogenation, etc.) in another stage of the same system.

For a better understanding of the principles, objects and mode of execution of my invention, I shall describe its application to a simple system comprising in series two stages. In the first or endothermic stage, a normally liquid organic compound is vaporized. In the second or exothermic stage, which is in communication with the first stage (vaporizer), the vapors of the material leaving the vaporizer are subjected to an exothermic chemical reaction or treatment. It is desired to maintain the temperature in the endothermic stage within a definite temperature range, and it is also desired to maintain the temperature in the exothermic stage within a definite temperature range which may be the same or different than the temperature maintained in the endothermic stage. In accordance with my invention, these objects are attained by providing two separate and substantially independent circulatory systems which are capable of being put into at least temporary and periodical communication, each system comprising a circuitous conduit through which a fluid heat-transfer medium is circulated. These two independent circuits are hereinafter designated as the "hot circuit" and the "cold circuit". These terms are used merely for the sake of convenience; they are not limitative in the sense that the circulating heat-transfer medium in one circuit is necessarily hot while that in the other is cold. The fluid in each system may be at a relatively high temperature, and the temperature of the fluid in the two circuits when the system is balanced and in operation, may be the same or different as the particular reaction or treatment system in which the temperature is controlled may dictate. The circulating heat-transfer medium in the hot circuit supplies the heat consumed in the endothermic stage; thus, the heat-transfer medium in the hot circuit is circulated as follows: It is passed into indirect heat exchange with the material undergoing endothermic treatment in the endothermic stage; leaving the endothermic stage wherein it has given up a part of its heat, the heat-transfer agent goes to the suction side of a suitable pump and is recycled back to the endothermic stage. The circulating heat-transfer medium in the cold circuit removes the heat generated in the exothermic stage. The cold circuit, then, comprises a circuitous conduit in which a suitable pump is inserted to circulate the heat-transfer medium into indirect heat exchange relationship with the material undergoing treatment in the exothermic stage.

The hot circuit and the cold circuit are in communication with each other and with a surge tank so that a controlled amount of the circulating heat-transfer medium in the one system can be intermittently or continuously introduced into the other system or vice versa as required to maintain the heat-transfer medium in each circuit at the desired temperature, the surge tank serving as compensator.

The process of this invention, although applicable to accurate temperature control in all multistage systems wherein at least one stage of the system operates endothermically while another stage operates exothermically, is of particular value as applied to the temperature control of catalyst masses in systems comprising at least one vaporization stage and at least one stage wherein the vapors leaving the vaporization stage are subjected to a vapor phase exothermic chemical reaction in the presence of a catalyst. In such systems, the process and apparatus of my invention provide means for accurately controlling the temperature in the vaporization stage or stages and the temperature of the catalyst mass in the stage or stages wherein the exothermic chemical reaction is effected with maximum thermal efficiency and minimum expenditure of energy. The exothermic reaction to which the vaporized material is subjected in the exothermic stage is immaterial in as far as this invention is concerned. For example, exothermic reactions such as oxidation, hydrogenation, reduction, burning out of impurities, and the like may be effected in one or a plurality of stages, in the presence or in the absence of a catalyst, and the temperature controlled by my method.

For a clear understanding of the invention, the same will be described in detail as applied to the control of the temperature in a system wherein a normally liquid unsaturated organic compound is vaporized and subjected to hydrogenation in the vapor phase in the presence of a hydrogenation catalyst. The invention is described with particular reference to a multi-stage concurrent-countercurrent system for effecting the hydrogenation of olefine polymers, such as, for example, olefine co-polymers as diisobutylene, triisobutylene, diisoamylene, etc. and olefine interpolymers such as are obtainable by polymerizing a tertiary olefine with ethylene, a secondary olefine or a dissimilar tertiary olefine, to the corresponding saturated paraffin hydrocarbons, many of which are valuable motor fuels and components of antiknock motor fuel compositions. Such a multi-stage concurrent-countercurrent process for effecting the vapor phase catalytic hydrogenation of unsaturated organic compounds, particularly normally liquid olefine polymers, is disclosed and claimed in U. S. patent application, Serial No. 22,570. When operated with only two hydrogenation stages, said process, in brief, comprises passing the vapors of the unsaturated material to be hydrogenated, together with hydrogen from the final hydrogenation stage and preferably with the unsaturated organic material in substantial stoichiometrical excess over the hydrogen, into contact with the hydrogenation catalyst under hydrogenation conditions in the first hydrogenation stage, condensing the material leaving the first hydrogenation stage to separate any unreacted hydrogen or other gaseous components therefrom, vaporizing the condensed material and passing it, together with fresh hydrogen or a hydrogen-containing gas first entering the system at that point and preferably with the free hydrogen in substantial stoichiometrical excess over the unsaturated material, into contact with a hydrogenation catalyst under hydrogenation conditions in the final hydrogenation stage wherein the hydrogenation is substantially completed. The material leaving the final reaction stage is cooled to condense the hydrogenation product and separate the excess hydrogen therefrom, the separated hydrogen being conducted to the first stage for utilization therein. It is to be understood that the temperature control system of this invention is described as applied to the above-mentioned hydrogenation system only for purposes of illustration; the principles of the same are applicable to a wide variety of other hydrogenation as well as other systems of one or multiple stages.

A suitable form of apparatus for executing my invention, and embodying my invention, for controlling the temperature in a multi-stage continuous concurrent-countercurrent process for effecting the vapor phase catalytic hydrogenation of an olefine polymer is shown in the accompanying drawing.

The drawing illustrates diagrammatically a suitable arrangement of apparatus for executing the temperature control process of the invention in a two stage vapor phase catalytic hydrogenation process in which the hydrogen passes countercurrently to the material to be hydrogenated into the system and concurrently with the material to be hydrogenated through each converter. On the drawing, both of the converters are shown partly in section for the purpose of illustrating the internal structure of a suitable converter which may be advantageously employed.

The drawing illustrates the temperature control system as applied separately to each hydrogenation stage and its accompanying vaporizer. This is merely for simplicity of illustration. As will be seen by those skilled in the art to which the invention relates, one temperature control system as illustrated is easily adapted to control the temperature in both hydrogenation stages and their accompanying vaporization stages.

The heat-transfer medium which is circulated through the hot and cold circuits of my temperature control system may be of gaseous, liquid or semi-liquid nature. In many cases, heat-transfer media which are in the liquid stage under the conditions prevailing in the particular circuit are preferred. Suitable heat-transfer media are, among others, lubricating oils, diphenyl, alkylated naphthalenes, high boiling esters, mercury, lead and other low-melting metals, low-melting alloys as Wood's metal, solder, bismuth solder, fused salts, eutectic mixtures of fused salts, molten sulphur, water, and the like which are sufficiently stable and exist in the desired state under the desired operating temperature and pressure. The heat-transfer medium used in the process as illustrated is a lubricating oil which is substantially stable at temperatures as high as about 400° C.

Referring to the drawing, reference figure IH designates a suitable heater or furnace which may be a part of the hot oil circuit and which serves to heat the oil circulated through it. The heated oil passes from the heater into conduit 3H which is provided with a suitable valve 2H and another suitable valve 4H as illustrated. The hot oil passes from conduit 3H into vaporizer heating jacket 5H wherein it passes into indirect heat exchange relationship with the material to be subsequently hydrogenated whereby said material is vaporized. The oil leaving the vaporizer heating jacket 5H passes therefrom through conduit 6H into a suitable surge tank 7HC. The surge tank provides means for compensation between the oil in the hot oil circuit and the cold oil circuit as will hereinafter be explained. The surge tank may, if necessary or desirable, be vented to the atmosphere by means of conduit 8H the outlet of which is above the surface of the liquid in the surge tank. Besides serving as a vent, conduit 8H may serve as an oil overflow line as well as a means for adding oil to the circulation system. From the surge tank, the oil of the hot circuit passes into conduit 9H and then through hot oil pump 10H by means of which the oil is circulated through the hot oil circuit described. Conduit 11H is a conventional pump by-pass line provided with a suitable valve. The use of this line merely facilitates control of the rate of circulation of the oil through the hot oil circuit. The circulating oil leaves the pump by means of conduit 12H from which it is circulated through the oil heater IH when desired. Conduit 13H, which is provided with a suitable valve, connects conduits 3H and 12H and provides means for cutting oil heater 1H from the system when the system becomes balanced and heating is no longer required, or it provides means for by-passing any desired amount of the circulating oil through the oil heater as may be required. The reference figures used to refer to the parts of the hot oil circuit are followed by the letter "H" to enable the hot oil flow to be readily followed by reference to the drawing. The reference figures used to designate parts of the cold oil circuit are followed by the letter "C". The above described hot oil circuit may be provided with additional valves, pumps, by-pass lines, etc., as desired or required by the particular operation.

The cold oil circuit is illustrated on the drawing as follows: Circulation of the oil through the cold oil circuit is effected by means of a suitable pump designated as 14C. Conduit 15C is a conventional pump by-pass line provided with a suitable valve and used to aid in controlling the rate of flow of the oil through the circuit. The oil leaves the pump through conduit 16C which is provided with a suitable regulating valve, or other valve capable of close adjustment, indicated by reference figure 17C. Conduit 16C is in communication with a suitable cooler 19C by means of conduit 18C, which conduit, beyond the cooler is provided with a suitable needle valve 20C. The conduit 18C, which includes cooler 19C and valve 20C, is a by-pass line providing means for cooling all or only a controlled part of the oil circulating in the cold oil system. After the temperature control system is in operation and balanced, such an amount of the oil is by-passed through the cooler and reintroduced into the main circuit through control valve 20C to maintain the desired temperature of the oil in the cold oil circuit. The cooler 19C may be of any suitable type, and the cooling may be effected by any suitable means with water or any other suitable cooling medium. From conduit 16C, the oil passes into conduit 21C and then into the cooling oil jacket of the converter, in which converter the hydrogenation of the unsaturated material vaporized in vaporizer 5H is effected. In the cooling oil jacket of the converter (22C), the circulating oil which surrounds the catalyst tubes as illustrated comes into indirect heat exchange relationship with the catalyst mass and absorbs heat therefrom. The oil, the temperature of which has been raised by contact with the catalyst tubes in the converter, leaves oil jacket 22C through conduit 23C and enters the suction side of pump 14C for recirculation through the described cold oil cycle. The cold oil circuit is in communication with surge tank 7HC (which is common to both the hot and cold circuits and is hence designated as "HC") by means of conduit 24C. This conduit admits oil from the surge tank into the cold oil circuit when such admission is necessary to balance the amount of oil in the cold oil and hot oil circuits. As indicated in the drawing, the oil may flow in either direction in conduit 24C as necessary to balance the amount of oil in the two circuits. When the temperature control system is in operation and balanced, there is substantially no flow of oil through conduit 24C. The described cold oil circuit may be provided with additional valves, pumps, etc. at suitable points in the circuit as necessary or desirable.

Besides the common surge tank 7HC, the function of which has been described, the cold oil circuit and the hot oil circuit may be put into communication by means of conduit 25HC which is provided with a suitable valve 26HC. Valve 26HC may be a needle valve or any other type adaptable to accurate adjustment of the flow of liquid in either direction through conduit 25H. When valve 26HC is open, conduit 12H is in communication with conduit 16C, and a measured amount of hot oil from the hot oil circuit may be introduced into the cold circuit or a measured amount of cold oil from the cold oil circuit may be introduced into the hot oil circuit, the surge tank 7HC serving as compensator. The function of conduit 25HC and valve 26HC will be made more clear when operation of the temperature control system is hereinafter considered. Conduit 27C, which is provided with a suitable valve, provides means for removal of any gas pocket which may be formed in the top of oil jacket 22C when the system is put into operation or when gases are formed due to the presence of extraneous substances such as water, air, decomposition products, etc., in the oil.

The illustrated hydrogenation process is executed as follows: The liquid polymer to be hydrogenated is fed from a suitable supply or storage tank (not shown) through conduit 28 into conduit 29. Hydrogen or a free hydrogen-containing gas is also fed into conduit 29 from conduit 30, preferably in such a relative amount that the unsaturated material is in substantial stoichiometrical excess over the free hydrogen in the gaseous mixture eventually entering the converter. The hydrogen from conduit 30 is excess hydrogen which has been passed through the final converter (converter B). Conduit 31 provides means for introduction of fresh hydrogen or free hydrogen-containing gas into conduit 30, if and when such addition becomes necessary. The free hydrogen or free hydrogen-containing gas and the liquid polymer together pass from conduit 29 into vaporizer A wherein they are brought into indirect heat exchange relationship with the hot oil circulating through vaporizer jacket 5H whereby the polymer is vaporized and the polymer vapors and the hydrogen or hydrogen-containing gas are preheated to the desired temperature. The preheated gaseous mixture leaves vaporizer A through conduit 32 and is passed into converter A. Converters A and B may be any suitable type of catalytic converter of either the uni-tube or multiple-tube type. Converters A and B need not be the same, as illustrated. One may be of the single catalyst tube type, or comprise a plurality of such single tubes, while the other is of the same or different type. The drawing illustrates, partly in section (converters A and B) conveniently employed multi-tube converters comprising a plurality of packed catalyst tubes surrounded by cooling oil jacket 22C and around which the oil in the cold oil circuit is circulated and carries off excess heat generated by the exothermic hydrogenation reaction occurring in the catalyst tubes whereby the temperature of the catalyst mass in the tubes is kept from rising too high. A variety of suitable catalysts may be used to effect the hydrogenation in the converters. Such suitable catalysts are described in co-pending U. S. application, Serial No. 22,570. The optimum temperature at which the catalyst in the converters is maintained will depend upon the particular material to be hydrogenated and upon the particular catalyst or catalyst composition used. A preferred temperature for the hydrogenation of olefine polymers in the vapor phase in the presence of a hydrogenation catalyst consisting of or comprising nickel metal is from 175° C. to 350° C. In this temperature range, an olefine polymer, such as diisobutylene, may be rapidly and substantially completely hydrogenated to the corresponding paraffin hydrocarbon with materially prolonged catalyst life and with the substantially obviation of decomposition and other undesirable side reactions.

The gaseous material leaving the primary converter A is passed by means of conduit 33 into a suitable condenser A. The cooling in condenser A is effected by any suitable or convenient means. In many cases, the ordinary type of water cooled coil type condenser is suitable. When the relative proportions of the polymer and hydrogen or hydrogen-containing gas entering the primary converter A are so regulated that the polymer is in substantial stoichiometrical excess over the free hydrogen, only a part of the entering polymer vapors are hydrogenated and substantially all of the free hydrogen initially present is consumed. From condenser A, the condensed materials and any gaseous uncondensed components pass into a suitable separator 34. Gases entering the separator along with the condensed polymer-hydrogenated polymer mixture may be vented to the atmosphere through vent pipe 35. The vented gases will be largely the inert constituents of the hydrogen-containing gas introduced into converter A since in most cases the free hydrogen will have been practically entirely consumed. The condensed polymer-hydrogenated polymer mixture is conducted by means of conduit 36 into vaporizer B. Hydrogen or a free hydrogen-containing gas, for example, a mixture of about 75% hydrogen and about 25% nitrogen obtainable by the dissociation of ammonia, is introduced into the system from a suitable storage tank (not shown) through conduit 37 which is in communication with conduit 36. The hydrogen or free hydrogen-containing gas is preferably admitted to the system in such an amount that the free hydrogen is in substantial stoichiometrical excess over the unsaturated hydrocarbon in the mixture brought into contact with the hydrogenation catalyst in final converter B. In vaporizer B, the liquid organic materials are vaporized and the vapors and hydrogen or hydrogen-containing gas are preheated by being brought into indirect heat exchange relationship with the hot oil circulated through the vaporizer hot oil jacket 5H. The gaseous preheated mixture leaving the vaporizer passes by means of conduit 38 into the final converter B wherein it is brought into contact with the hydrogenation catalyst contained therein under the desired hydrogenation conditions whereby the hydrogenation of the polymer material is substantially completed. The temperature of the catalyst mass in converter B is controlled by means of oil from the cold oil circuit being circulated through the cold oil jacket of the converter in accordance with the principles of my invention. The substantially completely hydrogenated material in the gaseous state along with the excess of hydrogen, and inert gaseous components when a hydrogen-containing gas is employed in the system, is passed by means of conduit 39 into a suitable condenser B which may or may not be of the same type as previously described condenser A. The mixture cooled and condensed in condenser B passes into separator 40 wherein the condensed liquid product is separated from the hydrogen or hydrogen-containing gas. The hydrogen or hydrogen-containing gas is conducted by means of conduit 30 to the primary converter for utilization therein. The liquid hydrogenated polymer product is conducted from separator 40 through conduit 41 to storage. Suitable valves and pumps may be inserted in the conduits of the above-described system as necessary or desirable.

Now, having described in detail a suitable assembly of apparatus for executing my invention, and having described a typical multi-stage system to which the principles of my novel temperature control system can be advantageously applied and the temperature in the several stages of said system accurately, economically and easily controlled, I will describe in detail, with reference to the drawing and described apparatus, a suitable method of executing the process of the invention.

Since the principles and mode of operation of the novel temperature control system illustrated in connection with vaporizer A and converter A are the same as for the separate temperature control system illustrated in connection with vaporizer B and converter B, the following discussion will, for the sake of convenience, be confined to the former.

Both the hot oil circuits and the cold oil circuit are filled with the required amount of the heat-transfer medium (in this case, oil) to be used. This may be done in any desirable manner, for example, by opening valve 26HC and charging the oil into surge tank 7HC through conduit 8H. The oil in both systems is then put into circulation and its temperature raised to about the desired point by passage through oil heater 1H. With valve 26HC closed, the temperature in each circuit is adjusted as closely as practicable. The temperature differential between the oil in the two substantially independent cold oil and hot oil circuits, the temperature differential between the oil of the hot oil circuit entering and leaving the vaporizer, and the temperature differential between the oil of the cold oil circuit entering and leaving the converter will be dependent upon the rate of circulation of the oil in the two circuits and may be varied to meet the particular requirements of the reaction system. For example, supposing it is desired to preheat the material entering the converter to about 170° C. and effect the hydrogenation in the converter at about 170° C. These temperatures can be maintained substantially constant in accordance with the process of my invention by circulating the oil in the hot circuit at such a rate and maintaining it at such a temperature that the oil enters the vaporizer oil jacket at a temperature of about 175° C., vaporizes the polymer material and preheats it together with the hydrogen or hydrogen-containing gas to about 170° C., and leaves the vaporizer at a temperature from about two to about five degrees below 175° C., and by circulating the oil in the cold circuit at such a rate and at such a temperature that the oil enters the converter oil at about 170° C., removes heat generated in the catalyst tubes, and leaves the converter at a temperature of from about two to about five degrees higher. The above temperature differentials are mentioned for purposes of illustration, they are not intended as limitative of the invention. It is, in general, desirable to use in one or both circuits, preferably always in the cooling or cold oil circuit, a relatively large volume of oil circulated at a high rate so as to obtain a good heat transfer coefficient with low temperature differential between the oil in and out of the stages wherein the temperature is controlled by adding or removing heat.

In accordance with my invention, the heat generated in the converter A due to the occurrence therein of the exothermic hydrogenation reaction is used to effect the endothermic vaporization and preheating treatments in the vaporizer. This is accomplished in the following manner. After the temperature of the oil in the cold oil circuit and the hot oil circuit is approximately adjusted as described by use of the oil heater 1H in the hot circuit and the cooler 19C in the cold circuit, and the hydrogenation reaction system is started, the heater may be gradually cut out of the hot circuit by means of valve 2H and conduit 13H until only a small amount or none of the circulating oil passes through the heater. In like manner, cooler 19C is by means of valves 17C and 20C partially or completely cut out of the cold circuit. The heat balance between the two circuits is then maintained by manipulation of valve 26HC which is in conduit 25HC by means of which oil from one circuit can be passed into the other circuit. When the temperature of the oil in the hot circuit drops below a minimum point a sufficient amount of oil from the cold circuit, the temperature of which has been raised by passage through the converter, is added to restore the balance. If the temperature in the hot oil circuit falls so low that it would upset the system too much if the temperature were adjusted by means of valve 26HC, the oil heater may be utilized until the balance is restored, or the balance may be restored by use of both valve 26HC and oil heater 1H. When the temperature of the oil in the cold circuit drops below a practical minimum, its temperature may be increased to the desired point and the balance restored by admitting from the hot oil circuit through valve 26HC the required amount of oil into said cold circuit. If the temperature of the oil in the cold circuit rises above a practical optimum valve, the cooling necessary to restore the balance may be effected by means of valve 26HC and/or by bypassing the required amount of the oil in the circuit, by means of conduit 18C and control valves 17C and 20C, through cooler 19C. It is seen that the temperature control system is extremely flexible and easily operated to accurately control the temperatures in the various stages of the system within a few degrees of the thermometric scale with a minimum of cost and expenditure of thermal energy because, once the system is in balance, only a very small amount of heating and/or cooling is necessary to maintain the equilibrium. Furthermore, the invention provides means for rapidly and easily attaining and maintaining the two circulatory systems in balance.

In the case that the heat energy picked up by the oil in the cold oil circuit passing into indirect heat exchange relationship with the catalyst tubes in which the exothermic hydrogenation reaction is effected is not sufficient to supply all of the heat necessary to supply the required amount of heat in the vaporizer and compensate for losses of heat by radiation from the circulatory systems, heat may be intermittently or continuously supplied to the hot oil circuit by means of the oil heater. Since the oil heater need not, in many cases, be operated continuously, and since when it is operated only a small part of the oil in the system need be heated, it is seen that my process, besides providing more accurate temperature control, is as regards fuel costs much more economically operated than the known processes comprising entirely independent heating and cooling circuits and wherein the entire bulk of the heat-transfer medium in the heating circuit is continuously heated. In addition, operation of my temperature control process requires less cooling since all of the heat imparted to the heat transfer medium in the converter cooling jacket need not be removed therefrom by use of a cooling agent as is required in the known processes.

It is obvious that the principles of this invention may be applied in many ways and types of apparatus different than those specifically described without departing from the spirit and scope of the invention, and that a wide variety of suitable heat-transfer agents may be used in accordance with the principles of the invention to accurately control the temperature in many chemical reactions and treatments wherein treatment and/or reaction is effected in a plurality of stages one or more of which operate endothermically and one or more of which operate exothermically. The process is applicable to use in any system wherein a normally liquid material is exothermically treated in the vapor phase because such a system of necessity comprises, besides the exothermic treatment stage, an endothermic treatment stage wherein the normally liquid material treated in the exothermically operated stage is previously vaporized. Thus, the method is applicable to systems wherein organic compounds are first vaporized or preheated and then subjected to an exothermic reaction or treatment such as hydrogenation, oxidation, polymerization, cracking, condensation, halogenation, reduction, etc. The process is also applicable to systems wherein an endothermic chemical reaction such as dehydrogenation, dehydration, dehalohydrination, etc., is effected in one stage of the system and an exothermic reaction or treatment is effected in another preceding or successive stage. For example, where dehydrogenation is effected in one stage and polymerization is effected in a subsequent stage. Other applications of this invention will readily occur to those skilled in the art.

Instead of having two separate temperature control systems with two oil heaters, two surge tanks, two coolers, etc., to control the temperature in the two stage reaction system shown by the drawing, one temperature control system can be used for both reaction stages. Furthermore, one temperature control system as herein described can be used to control the temperature in multiple stage reaction systems comprising more than two, for example, three, four, five, six or more reaction and/or treatment stages. If it is desired that the illustrated two stage system be operated with only one temperature control system, this can be done, for example, as follows: The separate temperature control system in communication with vaporizer B and converter B is dispensed with and the temperature control system in communication with vaporizer A and converter A is adapted to serve both vaporizers and both converters. The hot oil leaving the oil heater is passed directly into both vaporizers which are in parallel communication therewith and with the surge tank. The oil leaving the vaporizers passes into the surge tank from which all or a part of it is pumped through the oil heater completing the hot oil circuit. In like manner both converters are in parallel connection in the single cold oil circuit. The cold oil is circulated in parallel through both converters by means of a single cold oil pump, and, if necessary, a part of the oil leaving the converters is cooled by passage through one or a plurality of suitable coolers. In like manner, a single hot oil-cold oil system may be used to control the temperature as desired in more than two coupled vaporization-reaction stages.

I claim as my invention:

1. A process for controlling the treatment temperatures in multi-stage treatment systems wherein at least one stage operates endothermically while another stage of the same system operates exothermically, which comprises continuously circulating a fluid heat transfer medium in a closed circuit in which it is brought into indirect heat exchange relationship with and supplies heat to material undergoing endothermic treatment, continuously circulating a fluid heat transfer medium in another independent closed circuit, which may be put into communication with the first mentioned circuit so that a regulated amount of the fluid from one circuit can be admitted to the other, in which it is brought into indirect heat exchange relationship with and removes heat liberated in an exothermic stage, and utilizing at least a part of the heat imparted to the heat transfer medium in the circuit including the exothermic stage to supply at least a part of the heat required to be imparted to the material undergoing treatment in the endothermic stage by admitting a regulated amount of the circulating heat transfer medium from the former circuit into the latter circuit as required to maintain the desired thermal balance between the two circuits whereby the temperatures in the several treatment stages are maintained within the desired temperature ranges with a minimum of heating of the heat transfer medium in the circuit including the endothermic stage and a minimum of cooling of the heat transfer medium in the circuit including the exothermic stage.

2. A process for controlling the treatment temperatures in multi-stage treatment systems wherein at least one stage operates endothermically at an elevated temperature while another stage of the system operates exothermically at an elevated temperature which comprises continuously circulating a liquid heat transfer medium in a closed circuit in which it is brought into indirect heat exchange relationship with and supplies heat to material undergoing endothermic treatment, continuously circulating a fluid heat transfer medium of the same nature in another independent closed circuit in which it is brought into indirect heat exchange relationship with and removes heat liberated in an exothermic stage, and maintaining the desired thermal balance between the two circuits by admitting a regulated amount of the liquid heat transfer medium from one circuit to the other as required whereby the temperatures of the treatment stages embraced in the circuits are maintained within the desired temperature ranges with a minimum of heating of the circulating liquid in the circuit including the endothermic stage and a minimum of cooling of the circulating liquid in the circuit including the exothermic stage.

3. A process for controlling the vaporization and reaction temperatures in a system comprising a vaporization stage wherein a normally liquid material is heated and vaporized and a subsequent reaction stage wherein the vaporized material is subjected to an exothermic chemical reaction in the vapor phase which temperature control process comprises continuously circulating a fluid heat transfer medium in a closed circuit in which it is brought into indirect heat exchange relationship and supplies the heat required to effect the desired evaporation in the vaporization stage, continuously circulating a fluid heat transfer medium of the same nature in another independent closed circuit in which it is brought into indirect heat exchange relationship with and removes excess heat liberated in the exothermic reaction stage, and utilizing at least a part of the heat imparted to the circulating fluid in the circuit including the exothermic reaction stage to supply at least a part of the heat required to vaporize the material in the vaporization stage by admitting a regulated amount of the circulating fluid from the former circuit into the latter circuit as required to maintain the desired thermal balance between the two circuits whereby the vaporization and reaction temperatures are maintained within the desired temperature ranges with a minimum of heating of the circulating fluid in the circuit including the vaporization stage and a minimum of cooling of the circulating fluid in the circuit including the exothermic reaction stage.

4. A process for controlling the vaporization and reaction temperatures in a system comprising a vaporization stage wherein a normally liquid unsaturated organic compound is heated and vaporized and a subsequent reaction stage wherein said vaporized material is contacted, together with free hydrogen, with a hydrogenation catalyst under hydrogenation conditions which temperature control process comprises continuously circulating a liquid heat transfer medium in a closed circuit in which it is brought into indirect heat exchange relationship with and supplies the heat required to effect vaporization of the unsaturated organic compound in the vaporization stage, continuously circulating a liquid heat transfer medium of the same nature in another independent closed circuit in which it is brought into indirect heat exchange relationship with and removes excess heat from the catalyst mass in the exothermic catalytic hydrogenation stage, and utilizing at least a part of the heat imparted to the circulating liquid in the circuit including the hydrogenation stage to supply at least a part of the heat required to vaporize the unsaturated organic material in the vaporization stage by admitting a regulated amount of the circulating liquid from the former circuit into the latter circuit to maintain the desired temperature balance between the two circuits whereby the vaporization and reaction temperatures are maintained within the desired temperature ranges with a minimum of heating of the circulating liquid in the circuit including the vaporization stage and a minimum of cooling of the circulating liquid in the circuit including the hydrogenation stage.

5. A process for controlling the vaporization and reaction temperatures in a system comprising a vaporization stage wherein a normally liquid unsaturated organic compound is heated and vaporized and a subsequent reaction stage wherein said vaporized material is contacted with a hydrogenation catalyst under hydrogenation conditions which temperature control process comprises continuously circulating a liquid heat transfer medium in a closed circuit in which it is brought into indirect heat exchange relationship with and supplies the heat required to effect vaporization of the unsaturated organic compound in the vaporization stage, continuously circulating a liquid heat transfer medium of the same nature in another independent closed circuit in which it is brought into indirect heat exchange relationship with and removes excess heat from the catalyst mass in the exothermic catalytic hydrogenation stage, continuously supplying heat to the circulating liquid in the circuit including the vaporization stage by passing a minor portion of it through suitable heating means, continuously removing heat from the circulating liquid in the circuit including the hydrogenation stage by passing a minor portion of it through suitable cooling means, and maintaining the desired temperature balance between the two circuits by admitting a regulated amount of the circulating liquid from the heated circuit to the cooled circuit as required, whereby the vaporization and reaction temperatures are maintained within the desired temperature ranges with a minimum of heating of the circulating liquid in the circuit including the vaporization stage and a minimum of cooling of the circulating liquid in the circuit including the hydrogenation stage.

6. An apparatus for controlling the treatment temperatures in multi-stage treatment systems wherein at least one stage operates endothermically while another stage of the same system operates exothermically which comprises a closed circuitous system including a heat exchanger surrounding an endothermic treatment stage, means for circulating a fluid heat transfer medium through said circuitous system and means for imparting heat to at least a part of the circulating heat transfer medium, another independent closed circuitous system including a heat exchanger surrounding an exothermic treatment stage, means for circulating a fluid heat transfer medium through said circuitous system and means for removing heat from at least a part of the circulating heat transfer medium, said independent closed circuitous systems being in communication by control means whereby the circulating fluid from one circuit may be introduced into the other circuit in controlled amount to maintain the desired thermal balance between the two circuits with a minimum of heating and cooling.

7. An apparatus for controlling the treatment temperatures in multi-stage treatment systems wherein at least one stage operates endothermically while another stage of the same system operates exothermically which comprises a closed circuitous system including a heat exchanger surrounding an endothermic treatment stage, means for circulating a liquid heat transfer medium through said circuitous system, and a by-pass conduit including heating means through which a regulated amount of the liquid circulating through the system may be passed and heat imparted thereto, another independent closed circuitous system including a heat exchanger surrounding an exothermic treatment stage, means for circulating a liquid heat transfer medium through said circuitous system, and a by-pass conduit including cooling means through which a regulated amount of the liquid circulating through the system may be passed and heat removed therefrom, said independent closed circuitous systems being in communication at one point by means of a compensator tank containing a liquid heat transfer medium and in communication at another point by control means whereby the circulating liquid from one circuit may be introduced into the other circuit in controlled amount to maintain the desired thermal balance between the two circuits with a minimum of heating and cooling.

8. An apparatus for controlling the vaporization and reaction temperatures in a hydrogenation process wherein a normally liquid unsaturated material is vaporized in a vaporization stage and subsequently passed, together with free hydrogen, under hydrogenation conditions into contact with a hydrogenation catalyst in a hydrogenation stage which apparatus comprises a closed circuitous system including a heat exchanger surrounding the vaporization stage, means for circulating a liquid heat transfer medium through said circuitous system, and a by-pass conduit including heating means through which a regulated amount of the liquid circulating through the system may be passed and heat imparted thereto, another independent closed circuitous system including a heat exchanger surrounding the hydrogenation stage, means for circulating a liquid heat transfer medium through said circuitous system, and a by-pass conduit including cooling means through which a regulated amount of the liquid circulating through the system may be passed and heat removed therefrom, said independent closed circuitous systems being in communication at one point by means of a compensator tank containing a liquid heat transfer medium and in communication at another point by control means whereby the circulating liquid from one circuit may be introduced into the other circuit in controlled amount to maintain the desired thermal balance between the two circuits with a minimum of heating and cooling.

JULIO G. BEJARANO.